H. F. STRATTON.
ELECTRIC CONTROLLER.
APPLICATION FILED OCT. 23, 1917.

1,305,950.

Patented June 3, 1919.

INVENTOR.
Harry F. Stratton
BY
ATTORNEY.

UNITED STATES PATENT OFFICE.

HARRY F. STRATTON, OF CLEVELAND, OHIO, ASSIGNOR TO THE ELECTRIC CONTROLLER & MANUFACTURING COMPANY, OF CLEVELAND, OHIO, A CORPORATION OF OHIO.

ELECTRIC CONTROLLER.

1,305,950.    Specification of Letters Patent.    Patented June 3, 1919.

Application filed October 23, 1917. Serial No. 198,098.

*To all whom it may concern:*

Be it known that I, HARRY F. STRATTON, a citizen of the United States, residing at Cleveland, in the county of Cuyahoga and State of Ohio, have invented new and useful Improvements in Electric Controllers, of which the following is a specification.

My invention relates to apparatus for controlling electric motors, and particularly to controllers for accelerating motors from standstill to normal running speeds. It relates more particularly to automatically-actuated controllers in which the change from one step of acceleration, or set of starting connections, to another, or to the running connections is responsive to electrical conditions in the motor. While my invention in its broad aspects relates to the control of electric motors in general, it may be most readily disclosed as a modification of the electrical control apparatus shown and described in my Patent No. 1,225,686, granted May 8, 1917; therefore to simplify this patent application, my invention will be so disclosed.

The principal object of this invention is to provide a motor-controlling apparatus having an adjustable motor-starting voltage means, and a transition or other controlling relay energized by some function of the starting voltage and arranged so that when the motor-starting voltage is changed, the energizing voltage of the relay will be thereby changed, but not changed proportionally to the starting voltage change; that is to say, the said function will be changed.

Figure 1:
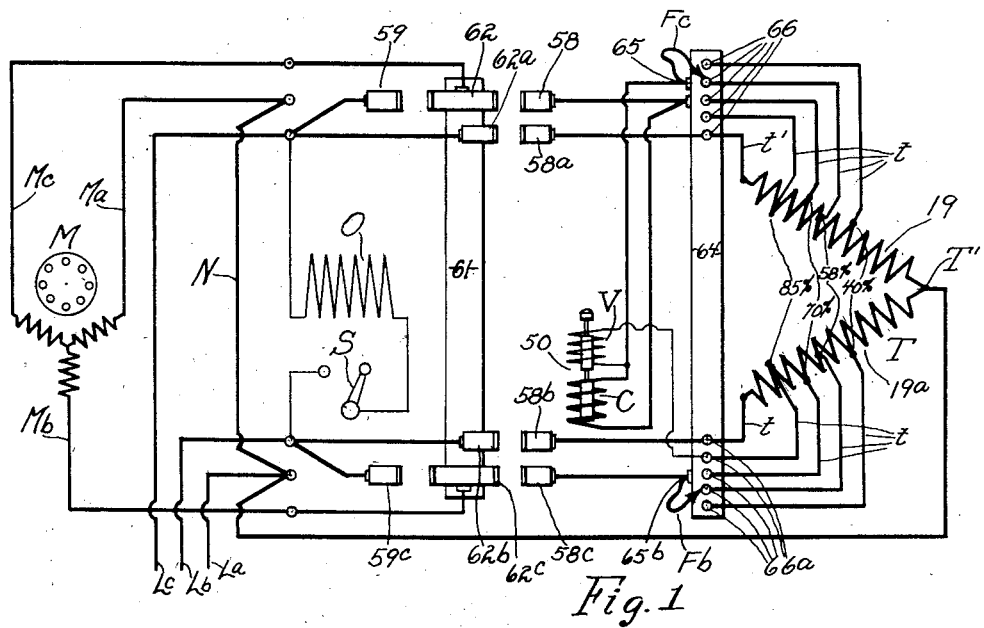
Figure 2:
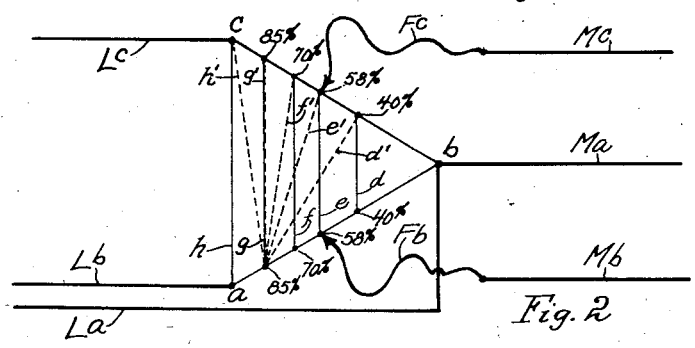
Figure 3:
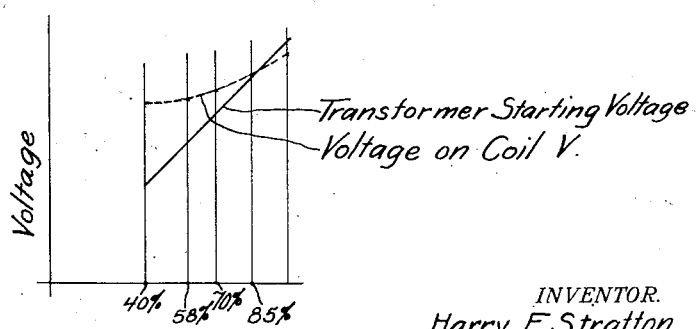

Referring to the accompanying drawings, Figure 1 is a diagram of connections of a motor control system embodying my invention. Fig. 2 is a diagram showing by vector method certain voltage relations in the system of Fig. 1. Fig. 3 shows in the form of curves the voltage relations illustrated in Fig. 2.

Referring to Fig. 1, I have shown at $L^a$, $L^b$, $L^c$, three mains from a source of three-phase alternating electromotive force for supplying current to the motor control system. M is a squirrel-cage induction motor. The transformer T, which I have shown as a three-phase auto-transformer, has the open-delta coils 19 and $19^a$. The coils are each shown with tap connections $t$ and the open or upper end connections $t'$. The lower ends of the coils are connected to the common conductor $T'$. By means of the tap connections $t$ the transformer is arranged to give 40%, 58%, 70%, and 85% of full line voltage. The connections $t$ and $t'$ from the transformer terminate at suitable terminals 66 and $66^a$ on a stationary insulating cross arm 64. Flexible conductors $F^c$ and $F^b$ each have one end secured to the cross arm 64 at 65 and $65^b$, respectively, and the other end free to be moved for adjustment purposes to connect with one of the terminals 66 or $66^a$, respectively. By this selective adjustment one or the other of the tap connections $t$ may be selected to give the starting voltage for the motor.

I provide stationary starting contacts 58, $58^a$, $58^b$, and $58^c$, and movable contacts 62, $62^a$, $62^b$, and $62^c$, and stationary running contacts 59 and $59^c$. The contacts 62 to $62^c$ are mounted on a movable cross arm 61, adapted to be moved first to the starting and then to the running position, so that the contacts 62 to $62^c$ engage, first, the contacts 58 to $58^c$, to give starting current to the motor through the transformer T, and then the contacts 62 and $62^c$ engage the contacts 59 and $59^c$ to give running current to the motor.

The mechanism for moving the cross arm 61 is not shown, but may be the same as that described in the hereinbefore mentioned patent. The coil O, which is the actuating coil for moving the cross arm 61, is connected for energization across the supply mains $L^c$ and $L^b$, and is controlled by the switch S. Also, as shown in that patent, the movement of the cross arm 61 from the starting to running position is under the control of a trip relay 50 having the shunt or voltage winding V and the current or series winding C. The shunt coil V has one end in electrical connection with the terminal 65, and hence with the selected voltage tap $t$ of the coil 19 of the transformer T. The other end of the winding is connected permanently to that terminal $66^a$ to which is also connected the 85% tap of the coil $19^a$ of the transformer. The series coil C is connected in the path of the main current of one of the phases carrying starting current, as will be described.

To start the motor M the switch S is closed, causing the winding O to be energized and the cross arm 61 to be moved to the starting position in which the contacts 62, 62ª, 62ᵇ, and 62ᶜ are in engagement with the starting contacts 58, 58ª, 58ᵇ, and 58ᶜ respectively. In this position the supply main Lᵇ is connected through the contacts 62ᵇ and 58ᵇ to the open-terminal of the transformer coil 19ª, and the supply main Lᶜ is connected through the contacts 62ª and 58ª to the open end of the coil winding 19, the supply main Lª being always connected to the remaining ends of the transformer windings, irrespective of the starting switch contacts. The motor lead Mᶜ is connected to the second terminal 66 through the contacts 62 and 58, the current coil C and the tap connector Fᶜ. The motor lead Mᵇ is connected to the second terminal 66ª through the contacts 62ᶜ and 58ᶜ and the tap connector Fᵇ, the motor lead Mª being always connected to the common point T' through the conductor N. Thus only a portion of the transformer is connected to the motor leads Mᵇ and Mᶜ, causing the motor to start under a voltage less than the line voltage. For any given connection of the tap connectors Fᵇ and Fᶜ with the tap terminals 66ª and 66, the upward pull of the coil V opposing the downward pull of the coil C, as described in the above mentioned patent, remains practically unchanged for the same line voltage, but the downward pull of the coil C varies with the current through the motor. When the movable cross arm 61 is first moved into starting position, the rush of current in the coil C causes the coil C to overpower the coil V. When the motor current decreases to such a value that the coil C is overpowered by the coil V, the cross arm 61 is released and moves to the running position in which the supply main Lᵇ is connected directly to the motor lead Mᵇ through the contacts 59ᶜ and 62ᶜ, and the supply main Lᶜ is connected directly to the motor lead Mᶜ through the contacts 59 and 62, the supply main Lª being connected to the motor Mª through the conductor N. The transformer and the coils C and V are now disconnected from the supply mains, and a full voltage of the source of current supply is impressed on the motor, whereby the motor is quickly accelerated to running speed. When the winding O is deënergized, the cross member 61 is released and moves to the neutral position shown.

The windings of the transition relay 50 are so proportioned that the coil V will overcome the coil C when the motor current in the coil C has been reduced by the starting of the motor to such a value that the closing of the running contacts will cause the motor current to rise to a suitable value. The coil V is, as has been shown, energized in general by the transformer voltage. In the patent above referred to, the connections of the coil V are such that, when the starting voltage is changed by connecting the flexible connectors Fᶜ and Fᵇ to selected taps 66 and 66ª, the energizing voltage on the coil V will be proportionately changed, but it is sometimes desirable that, when the motor starting voltage is reduced by adjustment, say, from the 85% tap to a lower tap, the voltage on the coil V be reduced but less in amount than the starting voltage is reduced by the adjustment of the taps. It is also desirable that this change shall be made automatically when the transformer taps are changed. I accomplish these two desirable things by connecting the coil V as shown in Fig. 1 and as described above.

The relations of the different voltages of the adjustable motor-starting transformer at different adjustments to the corresponding voltages on the coil V, are shown in Fig. 2. The supply mains Lª, Lᵇ, Lᶜ, the motor leads Mª, Mᵇ, Mᶜ, and the flexible connectors Fᶜ and Fᵇ are here reproduced. The coils of the transformer are represented by the vector lines ab and cb. The 40%, 58%, 70%, and 85% transformer-voltage tap-connection points are vectorially located as indicated. The vertical solid lines d, e, f, g, h, therefore, represent the starting voltages impressed on the motor at different adjustments from the 40% tap to full line voltage, respectively. The dotted lines d', e', f', g', h', represent the voltages impressed on the coil V for the said adjustments of the starting voltage. According to the particular transformer selective adjustment of Fig. 1, the transformer starting voltage of Fig. 1 is represented in Fig. 2 by the line e and the voltage on the coil V by the line e'.

These relations of the transformer starting voltage and the voltage on the coil V are graphically represented in Fig. 3 by solid and dotted lines respectively.

While, as above described, one terminal of the coil V is connected to the voltage tap of one core of the transformer supplying starting voltage to the motor, and the other terminal of the coil V is permanently connected to the 85% tap of the other coil, to satisfy one set of motor-starting requirements, it will be understood that the other motor-starting conditions might require that the permanent connection of one end of the coil be made to some other one of the transformer taps, and my invention is therefore not limited to the exact connections shown and described.

I claim—

1. In an electric control system, a source of electro-motive force, a receiving circuit, an electro-responsive device for controlling the circuit, a voltage-reducing means for supplying a reduced voltage to the circuit and to the device, and means whereby the amount of voltage reduction may be changed, and whereby, when the voltage on the receiving circuit is changed, the voltage on the electro-responsive device is thereby automatically changed disproportionally to the change of voltage on the receiving circuit.

2. In an electric control system, a source of electro-motive force, a receiving circuit, an electro-responsive device for controlling the circuit, a voltage-reducing means for supplying a reduced voltage to the circuit and to the device, and means whereby the amount of voltage reduction may be adjusted, and whereby, when the voltage on the receiving circuit is changed, the voltage on the electro-responsive device is thereby automatically changed by an amount less than that which is proportional to the amount of change of the circuit voltage.

3. In an electric control system, a source of electro-motive force, a receiving circuit, an electro-responsive device for controlling the circuit, a voltage transforming means for supplying a transformed voltage to the circuit and to the device, and means whereby the ratio of transformation of the voltage may be changed, and whereby, when the voltage on the receiving circuit is changed, the voltage on the electro-responsive device is thereby changed by an amount less than that which is proportional to the amount of change of the circuit voltage.

4. In an electric control system, a source of electro-motive force, a receiving circuit, an electro-responsive device for controlling the circuit, a voltage transforming means for supplying a transformed voltage to the circuit and to the device, and means whereby the ratio of transformation of the voltage may be changed, and whereby, when the voltage on the receiving circuit is changed, the voltage on the electro-responsive device is thereby automatically changed by an amount disproportional to the amount of change of the circuit voltage.

5. In an electric control system, a source of electro-motive force, a receiving circuit, an electro-responsive device for controlling the circuit, a transformer for supplying a reduced voltage to the circuit and to the device, and means, including adjustable tap connections on the transformer whereby the reduced voltage may be changed, and, whereby, when the reduced voltage on the circuit is changed, the voltage on the device is changed disproportionally to the change of voltage on the circuit.

6. In an electric control system, a source of electro-motive force, a receiving circuit, an electro-responsive device for controlling the circuit, a transformer for supplying a reduced voltage to the circuit and to the device, and means including adjustable tap connections on the transformer whereby the reduced voltage may be changed, and whereby, when the voltage on the circuit is changed, the voltage on the device is thereby automatically changed by an amount less than that which is proportional to the amount of change of the circuit voltage.

7. In an electric control system, a source of electro-motive force, a receiving circuit, an electro-responsive device having a winding, a transformer for supplying a reduced voltage to the circuit and to the device, and tap connections on the transformer, whereby the reduced voltage may be varied, one end of the winding of the electro-responsive device being adjustably connected to the transformer taps and the other end of the winding being connected permanently to one of the taps, whereby, when the reduced voltage on the circuit is varied by adjusting the transformer taps, the reduced voltage on the device will be automatically changed by an amount disproportional to the change of the reduced voltage.

8. In an electric control system, a source of electro-motive force, a receiving circuit, an electro-responsive device having a winding, a transformer for supplying a reduced voltage to the circuit and to the device, tap connections on the transformer whereby the reduced voltage may be varied, one end of the winding of the electro-responsive device being adjustably connected to the transformer taps and the other end of the winding being connected permanently to one of the taps, whereby, when the reduced voltage on the circuit is varied by adjusting the transformer taps, the reduced voltage on the device will be automatically and correspondingly changed by an amount less than that which is proportional to the amount of change of the circuit voltage.

9. In a motor control system, a source of supply, an induction motor, an adjustable transformer for supplying starting voltage for the motor, means for connecting the motor to the transformer and directly to the source, and means, including a winding, whereby the change of the motor connections from the transformer to the source is controlled, and whereby, when the transformer is adjusted to increase or decrease the starting voltage, the energizing current of the winding will be respectively increased or decreased by an amount less than that which is proportional to the amount of increase or decrease of the starting voltage.

10. In a motor control system, a source of supply, an induction motor, an adjustable transformer for supplying starting voltage for the motor, means for connecting the motor to the transformer and directly to the source, and means whereby the change of the motor connections from the transformer to the source is controlled, so that, when the transformer is adjusted to change the starting voltage, the energizing current of the winding will be changed by an amount disproportional to the amount of change of the starting voltage.

11. In an electric control system, a source of electro-motive force, a receiving circuit, an electro-responsive device for controlling the circuit, a voltage-reducing means for supplying a reduced initial voltage to the circuit and to the device, and means whereby the amount of initial voltage reduction may be adjusted, and whereby, when the voltage on the receiving circuit is so adjusted, the voltage on the electro-responsive device is thereby automatically changed disproportionally to the change of voltage on the receiving circuit.

Signed at Cleveland, Ohio, this 13th day of October, 1917.

HARRY F. STRATTON.